United States Patent
Niehr et al.

(10) Patent No.: US 9,205,985 B2
(45) Date of Patent: Dec. 8, 2015

(54) TRANSPORTER

(75) Inventors: Thomas Niehr, Stein Ebernburg (DE); Jurgen Vorwerk, Morsdorf (DE)

(73) Assignee: KHS GmbH, Dortmund (DE)

( * ) Notice: Subject to any disclaimer, the term of this patent is extended or adjusted under 35 U.S.C. 154(b) by 31 days.

(21) Appl. No.: 14/130,998

(22) PCT Filed: Jun. 2, 2012

(86) PCT No.: PCT/EP2012/002351
§ 371 (c)(1),
(2), (4) Date: Jan. 6, 2014

(87) PCT Pub. No.: WO2013/004324
PCT Pub. Date: Jan. 10, 2013

(65) Prior Publication Data
US 2014/0151193 A1  Jun. 5, 2014

(30) Foreign Application Priority Data

Jul. 5, 2011  (DE) .................... 10 2011 106 761

(51) Int. Cl.
B65G 47/84 (2006.01)
B65G 17/00 (2006.01)
B65G 47/86 (2006.01)

(52) U.S. Cl.
CPC ............ B65G 17/005 (2013.01); B65G 47/841 (2013.01); B65G 47/842 (2013.01)

(58) Field of Classification Search
CPC ... B65G 17/005; B65G 47/841; B65G 47/842
See application file for complete search history.

(56) References Cited

U.S. PATENT DOCUMENTS

| | | | |
|---|---|---|---|
| 5,598,859 A * | 2/1997 | Kronseder | 134/62 |
| 5,630,679 A | 5/1997 | Simkowski et al. | |
| 7,748,518 B2 * | 7/2010 | Hollriegl et al. | 198/470.1 |
| 8,172,290 B2 * | 5/2012 | Nishino et al. | 294/99.1 |
| 8,226,331 B2 * | 7/2012 | Derouault et al. | 406/88 |
| 8,307,977 B2 * | 11/2012 | Nguyen et al. | 198/803.9 |
| 8,439,181 B2 * | 5/2013 | Hausladen | 198/478.1 |
| 2010/0061831 A1 * | 3/2010 | Nishino et al. | 414/225.01 |
| 2010/0077703 A1 | 4/2010 | Gourlaouen | |

FOREIGN PATENT DOCUMENTS

| | | |
|---|---|---|
| CN | 1224402 | 7/1999 |
| DE | 41 31 699 | 3/1993 |
| EP | 1 106 545 | 6/2001 |
| EP | 1 220 787 | 9/2003 |
| EP | 1 081 068 | 5/2005 |
| EP | 2 123 580 | 11/2009 |
| JP | 04 341422 | 11/1992 |
| JP | 2001 287 795 | 10/2001 |
| WO | WO 00/37 353 | 6/2000 |
| WO | WO 01/42113 | 6/2001 |

* cited by examiner

*Primary Examiner* — Gene Crawford
*Assistant Examiner* — Thomas Randazzo
(74) *Attorney, Agent, or Firm* — Occhiuti & Rohlicek LLP

(57) ABSTRACT

A container carrier that moves containers in a transport direction has container holder with a recess and a hold-down. The recess receives a container between its mouth and its flange and forms a bearing surface to support a lower face of the flange thereby suspending the container. Meanwhile, the hold-down engages the opposite or top face of the flange to prevent the container from swinging.

14 Claims, 5 Drawing Sheets

TRANSPORTER

RELATED APPLICATIONS

This application is the national stage entry under 35 USC 371 of PCT application PCT/EP2012/002351, filed on Jun. 2, 2012, which claims the benefit of the Jul. 5, 2011 priority date of German application DE 102011106761.6, the contents of which are herein incorporated by reference.

FIELD OF INVENTION

The invention relates to a transporter for the suspended transporting of containers and specifically to a linear transporter for the cycled or incremental transporting of containers that are moved incrementally in an at least single-track container flow along a transport path, held suspended by a container neck and that has respective container openings.

BACKGROUND

Linear transporters are in particular also known as part of container treatment machines (EP 1 081 068 B1, EP 1 220 787 B1), with the containers being cycled, i.e. moved incrementally, along the transport path for their treatment at different treatment stations or treatment positions that succeed one another in the transport direction, while preferably held suspended by a container flange and in a multi-track container flow. Because of the cycled transport movement, the containers, which are held suspended, tend to swing or oscillate about axes oriented horizontal with and perpendicular to the transport direction. This impairs the reliability of the process. Among other things, there is also the danger that after the filling of the containers, filling material will spill out of the not-yet-sealed swinging containers, which then leads to a soiling and possibly also to an extremely undesirable contamination of the installation or device concerned with the spilt or splashed filling material, which then acts as a nutritive medium for bacteria.

SUMMARY

The object of the invention is to provide a transporter that, with minimal design effort, avoids a swinging or oscillating of the suspended containers as a result of the cycled or incremental movement.

The swinging or oscillating of the containers as caused by the cycled movement is effectively prevented by hold-down and support elements that are provided on the container holders and/or at the edges of the grooves and that form additional contact surfaces for that side of the container flanges that faces the respective container mouth. At the same time the transporter is very simply designed in regard to its container holders such that, in particular, an entry and exit of the containers respectively into and out of the container holders is also possible. Beside the container carriers, no other elements that are moved synchronously with these container carriers and that prevent the oscillating or swinging are needed. The hold-down and support elements are provided directly on the container carriers or on those elements of the container carriers forming the container holders, and/or are permanently connected to the container carriers or to the elements. The hold-down or support elements are preferably executed as a single piece with the container carriers or with elements forming the container holders.

"Containers" in the sense of the invention are in particular those that, below their container opening or mouth, are configured with a projecting container flange, e.g. containers or bottles made of plastic, for example PET.

The term "linear transporter" in the sense of the invention is to be understood to mean a transporter in which the transport path formed between a container entry and a container exit possesses a straight course at least in a partial region, i.e. that is configured for a linear transport of the containers.

For the purpose of the invention the expression "substantially" means variations from the respective exact value by +/−10%, preferably by +/−5% and/or variations in form with changes insignificant for function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below in the detailed description and in the accompanying figures, in which.

DETAILED DESCRIPTION

Figure 1:
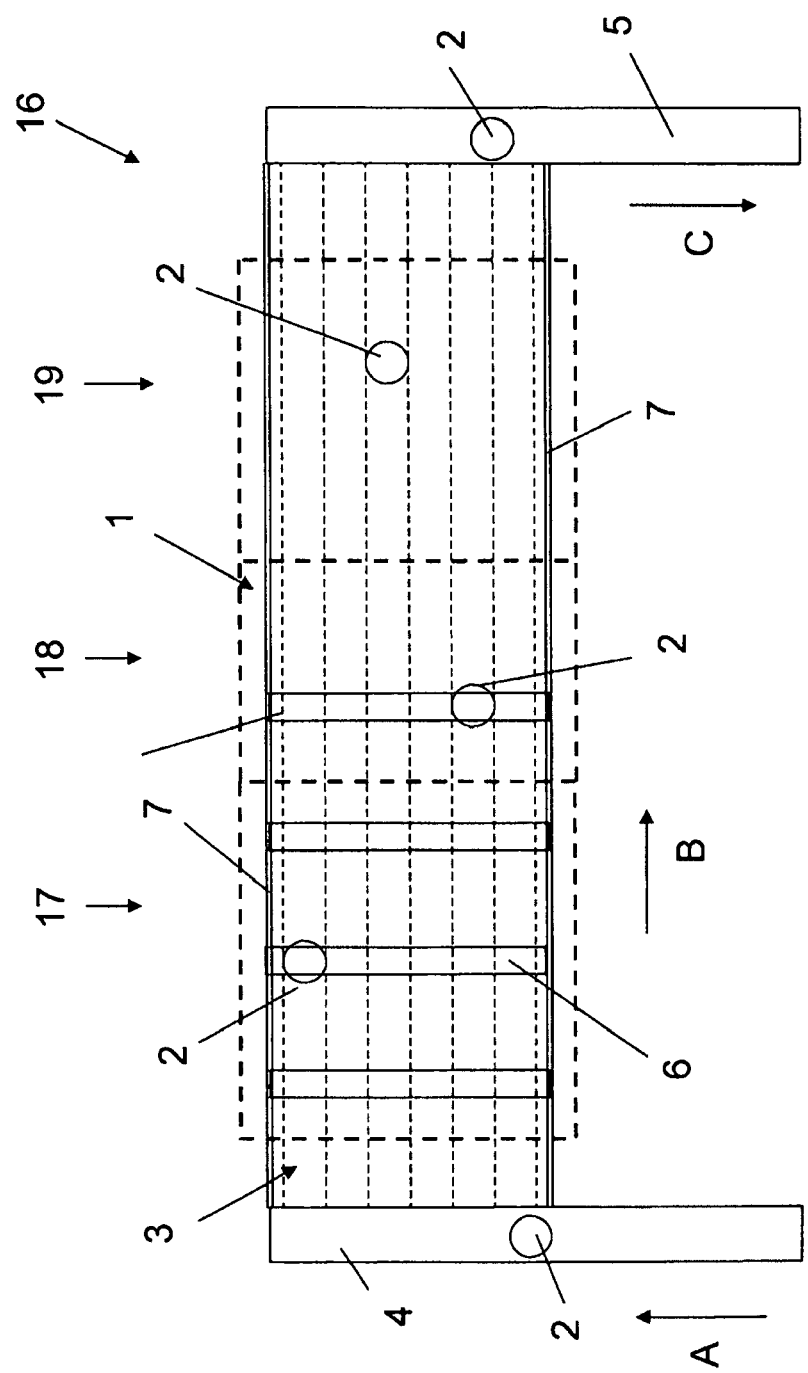
FIG. 1 shows, in a greatly simplified schematic depiction and in plan view, a transporter for transporting containers in the form of bottles.

The transporter, which is generally designated by 1 in FIG. 1 and configured as a linear transporter, is used to transport containers 2 with their container axes BA oriented vertically or substantially vertically in a multi-track container flow, i.e. in the case of the depicted embodiment, in a six-track container flow, along a linear transport path 3, specifically in a transport direction A. Containers 2 are fed to transport path 3 via a container entry 4 according to arrow B, and at the end of transport path 3, which is located at the rear relative to transport direction A, are discharged via a container exit according to arrow C.

In detail, transporter 1 is configured for a cycled or incremental transport during which containers 2 are held suspended by a container flange 2.3 configured below their container mouth 2.1 on a container neck 2.2. To this end, transporter 1 in the depicted embodiment exhibits a plurality of container carriers 6 that are for example plate-shaped, that by their longitudinal extension are oriented horizontally or substantially horizontally and square or substantially square to transport direction A, and that are moved by cycling or by incremental movement in a transport direction A along transport path 3. Container carriers 6 are attached at either end to a transport element 7 that forms a continuous loop, that is oriented with the loop plane parallel to the transport direction, and that is driven by endless cycling or incrementally, for example in the form of a transport chain or transport belt.

Container carriers 6 are each provided with a plurality of container holders 8, and specifically each with one container holder 8 for each track of the multi-track container flow. In the depicted embodiment, container holders 8 are each formed by a groove 9 that, among other things, is open (groove opening 10) on the lateral side of container carrier 6, which is the leading side relative to transport direction A, and closed on the side opposite groove opening 10. Furthermore, each groove 9 is configured in such a way that it extends from an upper side 6.1 to an underside 6.2 of container carrier 6 and that, starting from a groove opening 10, has an edge 11. The edge 11 has a first edge section 11.1 that is curved and concave on the inside of the groove opening 10, followed by a second edge section 11.2 having or substantially having the shape of the arc of a circle and also defining the closed end of the groove 9, and again followed by a third edge section 11.3 that ends at the groove opening 10 and which, in the depicted embodiment, is straight-lined or substantially straight-lined in configuration. The axes of curvature of the first and second edge sections 11.1 and 11.2 are each vertical or substantially vertical axes, i.e. axes that are oriented square to the upper side 6.1 and/or underside 6.2 of container carriers 6.

Figure 3:
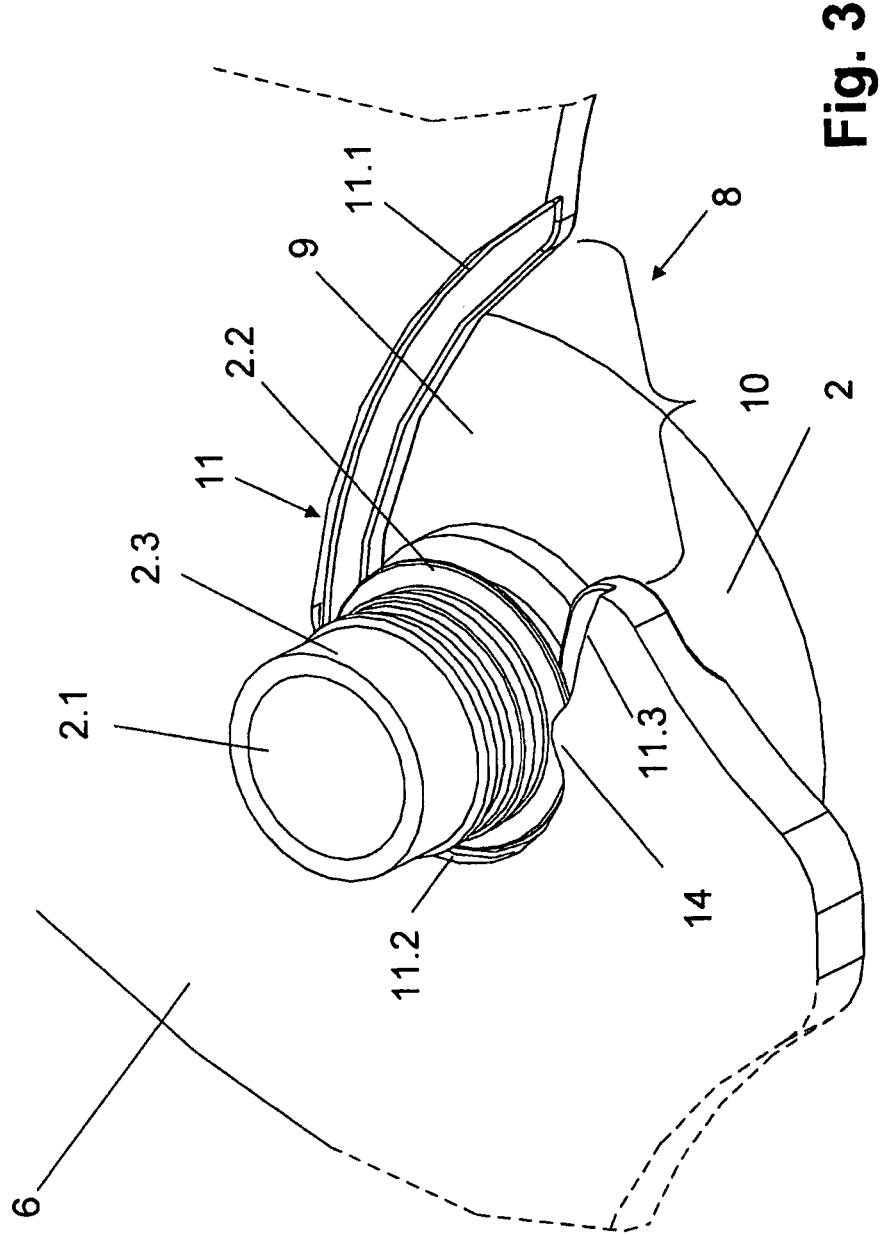
FIG. 3 shows a magnified representation of a detail of FIG. 2.
Figure 4:
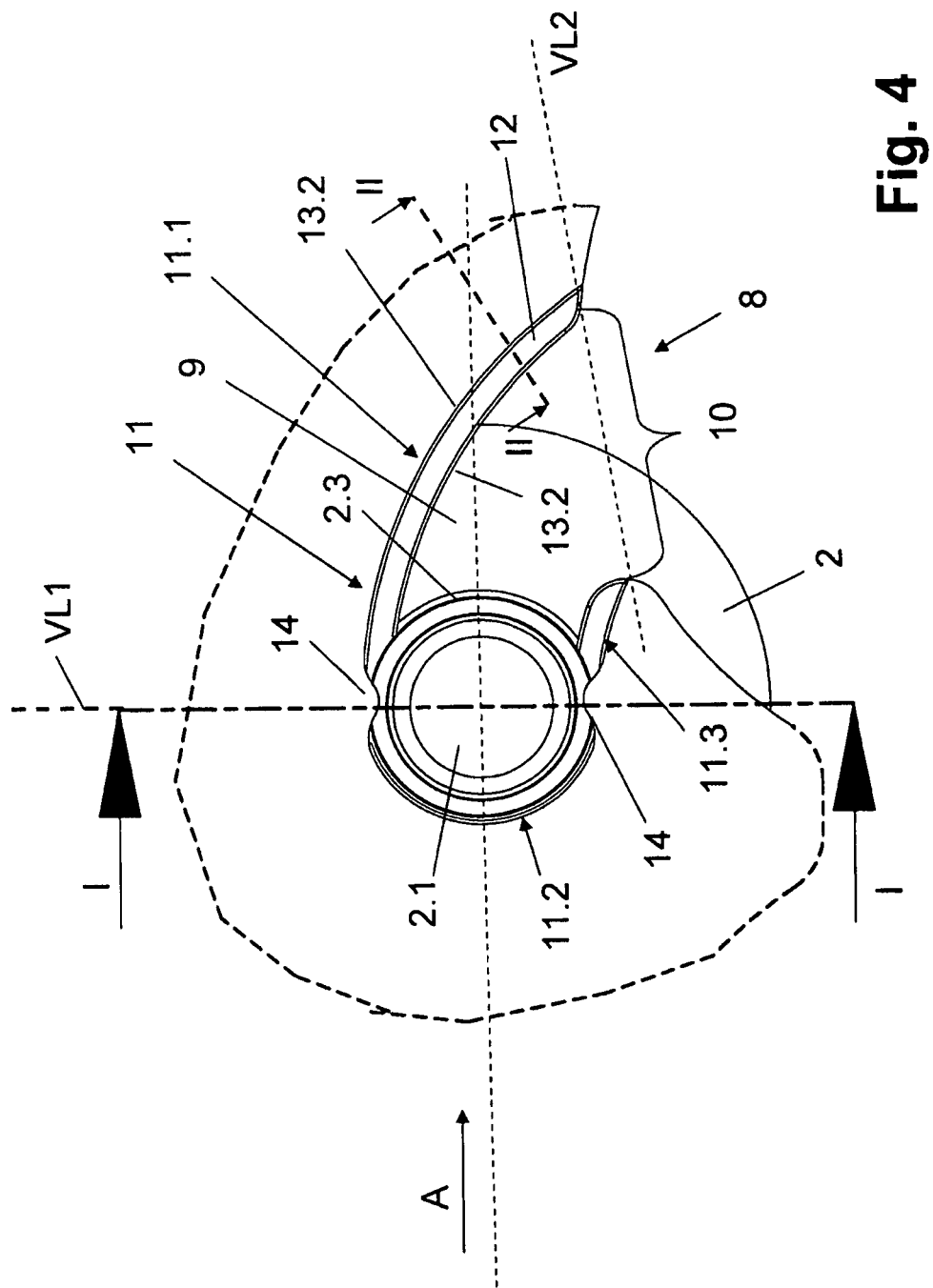
FIG. 4 shows a magnified partial representation a plan view of one of the transport elements, together with a container.

As FIGS. 3 and 4 in particular show grooves 9, which form container holders 8, are moreover configured in such a way that the first edge section 11.1 exhibits a significantly greater length than the third edge section 11.3, i.e. at the third edge sections 11.3, the lateral sides of container carriers 6, which is the leading side relative to transport direction A, are configured to be recessed relative to the transport direction A with the ends of the first and third edge sections 11.1, 11.3 being connected by a connecting line VL2 that forms an acute angle relative to the transport direction A. Among other things, the entry and exit of containers 2 respectively into and from the container holders 8 is improved by the described configuration of edge 11, i.e. in particular an entry and exit of containers 2 that is along a line that forms and angle with and is lateral relative to transport direction A.

Figure 6:
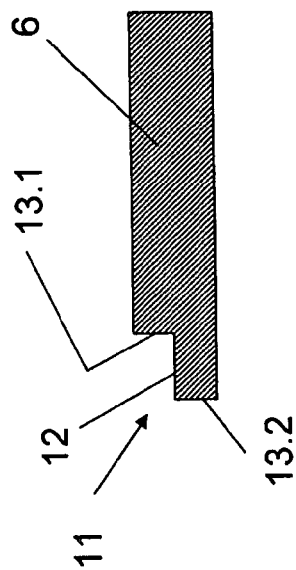
FIG. 6 shows a section on line II-II of FIG. 4.
Figure 2:
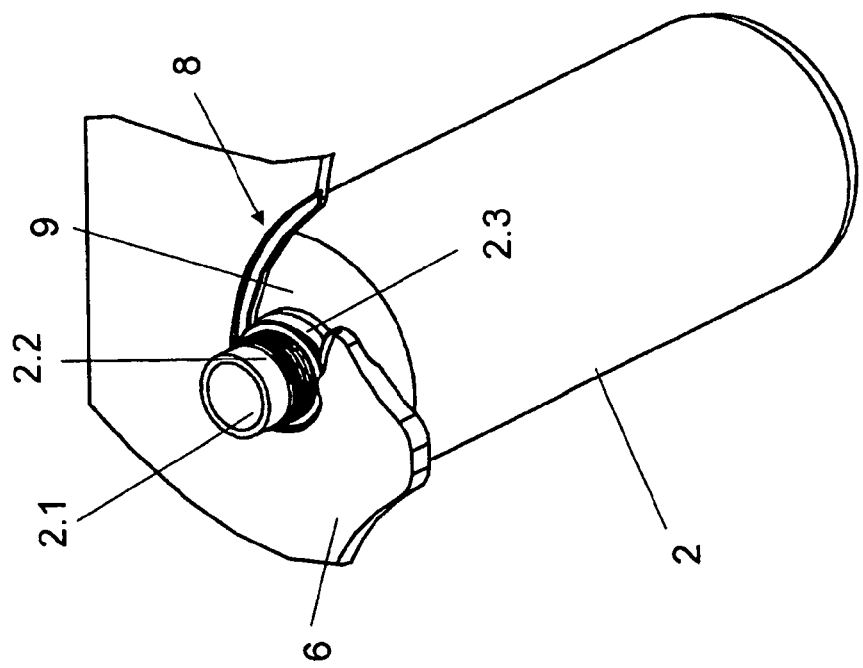
FIG. 2 shows, in a perspective partial depiction, one of the transport elements of the transporter of FIG. 1, together with a container held suspended on a container holder of this transport element.

Containers 2 are each held suspended by their container flange 2.3 at edges 11 of container holders 8. To this end, the respective edge 11 is configured in the form of a step on all edge sections 11.1-11.3 as shown in FIG. 6 and in such a manner that along the entire edge 11 on a level between upper side 6.1 and underside 6.2 of a container carrier 6 there are formed a bearing surface 12 on which respective container flange 2.3 rests, and oriented at right angles to lateral support faces 13.1 and 13.2, to act as a lateral contact for container flange 2.3 (upper support face 13.1) and the container neck (lower support faces 13.2).

During transport, containers 2 are arranged in container holders 8 in such a way that respective container neck 2.2 and container flange 2.3 against edge section 11.2, which has the shape of the arc of a circle, i.e. against contact surface 12 and support faces 13.1 and 13.2, or exhibit a short distance away from support faces 13.1 and 13.2, for example a distance of the order of 0.5 mm to 1.0 mm.

The particularity of transporter 1 or of container carriers 6 consists in the fact that container holders 8 or grooves 9 that form the holders are additionally provided with hold-down and support elements or with hold-downs 14 that lie against the upper side of respective container flange 2.3, whose upper side faces container mouth 2, such that in the region of each hold-down 14, respective container flange 2.3 is held between the hold-down 14 and the bearing surface 12. This avoids or at least greatly reduces swinging of containers 2 during transport as a result of the cycled transport movement.

Figure 5:
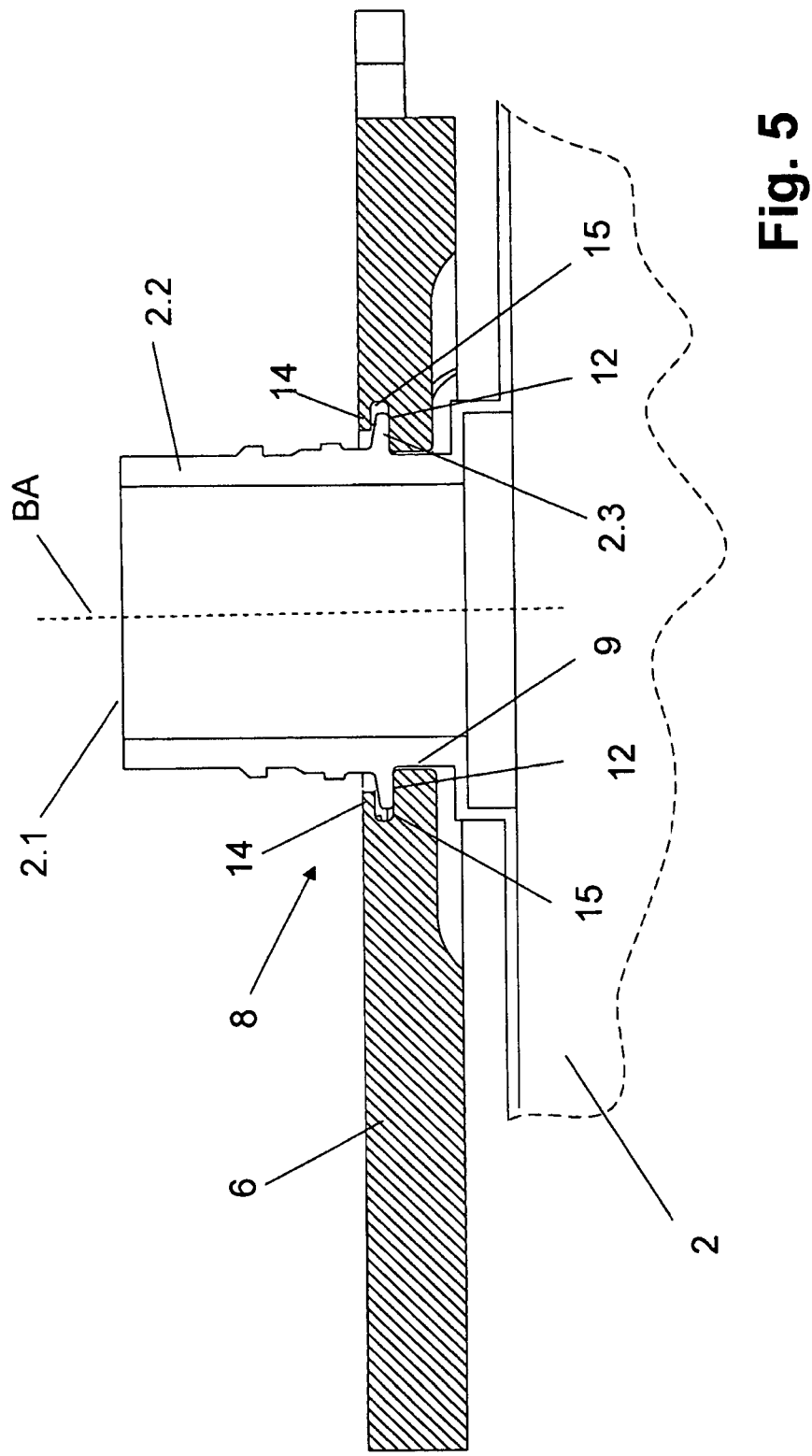
FIG. 5 shows a section on line I-I of FIG. 4.

In the case of the depicted embodiment, hold-downs 14 are each formed by lugs that extend on the container carrier upper side 6.1 starting from the lateral contact surface 13.1 over part of the width of bearing surface 12 and form between themselves and bearing surface 12 a gap 15 receiving respective container flange 2.3, as shown in FIG. 5.

In the case of the depicted embodiment, each of the additional contact surfaces for the lug-like hold-downs 14 forming the side of container flange 2.3 that faces the container mouth 2.1 is provided such that each container holder 8 has two hold-downs 14, which are provided in the region of the ends of edge section 11.2. The two hold-downs 14 of each container holder 8 are arranged opposite one another on the groove 9 in an axial direction parallel or substantially parallel to the longitudinal extension of the container carrier 6 and hence in an axial direction perpendicular or substantially perpendicular to the transport direction A, and in the case of the depicted embodiment in such a way that a connecting line VL1 between the two hold-downs 14 of each container holder 8 is laterally offset relative to the curvature axis of the edge section 11.2, specifically in the direction towards the groove opening 10 or towards the lateral side of container carrier 6, which is the leading side in the transport direction. Relative to the closed end of the respective recess or groove 9, the connecting line VL1 is offset in the transport direction A by an amount that is greater than half the outside diameter of the container neck 2.2 or that is greater than half the width that the recess or groove 9 has at its closed end, preferably by a factor ranging between 1.015 and 1.035, for example by a factor of around 1.03.

In conjunction with the arrangement of the connecting line VL1 described above, the additional contact faces that are formed by the lug-like hold-downs 14 for the side of respective container flange 2.3 that faces the container mouth 2.1 not only suppress the swinging of containers 2 during the cycled transport but also ensure that the tipping energy of the respective container 2 is used to hold the container flange 2.3 in its desired position in the container holder 8 or to return it to this desired position at the closed end of the groove 9.

Hold-downs 14 are, for example, configured such that the width of a respective gap 15 in the vertical direction is some 0.2 mm greater than the thickness of a container flange 2.3.

In the case of the depicted embodiment, the transporter 1 is part of a device or installation 16 for handling containers 2, for example, a device or installation for filling containers 2 with a filling material and for the subsequent sealing of filled containers 2. Accordingly, handling sections are provided along transport path 3. These handling sections succeed one another in transport direction A, there being a section 17 for pretreating containers 2, for example for washing and/or disinfecting and/or sterilizing containers 2, a section 18 for filling containers 2 with a filling material, and a section 19 for sealing filled containers 2.

The invention has been described by reference to one embodiment. Numerous variations as well as modifications are possible without departing from the inventive concept underlying the invention.

It was assumed above that the grooves 9 that form the container holders 8 are configured in container carriers 6 in the practical execution of the transporter 1. The container carriers 6 are, however, each advantageously executed in multiple parts, each consisting, for example, of at least one carrier element held at both ends on a transport element 7 and to which a plurality of individual elements, each forming a container holder 8 or a groove 9, are then attached, preferably also interchangeably.

LIST OF REFERENCE CHARACTERS

1 Transporter
2 Container 2.1 Container mouth
2.2 Container neck
2.3 Container flange
3 Transport path
4 Container entry
5 Container exit
6 Container carrier
7 Transport element
8 Container holder
9 Groove
10 Groove opening
11 Edge
11.1 Edge section
11.2 Edge section
11.3 Edge section
12 Support surface
13.1 Lateral contact surface or support face
13.2 Lateral contact surface or support face
14 Hold-down
15 Gap
16 Handling machine
17-19 Section
A Transport direction of containers 2
B Arrow
C Arrow
BA Container axis
VL1 Connecting line
VL2 Connecting line Having described the invention, and a preferred embodiment thereof, what is claimed as new, and secured by Letters Patent is:

1. An apparatus for causing suspended containers to be transported along a linear transport path in a single-track container flow along a transport direction, wherein each of said containers comprises a container mouth, a container flange, and a container region between said container mouth and said container flange, wherein said container flange comprises a first side that faces said container mouth and a second side that faces away from said container mouth, wherein said apparatus comprises a transporter that comprises a plurality of container carriers that can be moved incrementally or cycled by a driver in a transport direction, wherein each of said container carriers comprises a container holder, wherein said container holder comprises a first structure and a first second-structure, wherein said first structure is selected from the group consisting of a recess and a groove, wherein said first second-structure is selected from the group consisting of a hold/down element, a hold-down, and a support element, wherein said first structure is configured to receive a container at said container region and to form a bearing surface to support said second face of said container flange, thereby suspending said container, and wherein said first second-structure contacts said first side of said container flange, wherein said container holder further comprises a second second-structure, wherein said second second-structure contacts said first side of said container flange, wherein said second second-structure is selected from the group consisting of a hold/down element, a hold-down, and a support element, and wherein said first second-structure and said second second-structure are produced as one piece with said container holder.

2. The apparatus of claim 1, wherein said first structure comprises a front end relative to said transport direction, a rear end relative to said transport direction, and an opening that is located at said front end, wherein said opening is configured for entry and exit of containers into and from said container holder, and wherein said first structure is closed at said rear end.

3. The apparatus of claim 1, wherein said first structure comprises a front end relative to said transport direction, a rear end relative to said transport direction, and an opening that is located at said front end, wherein said opening is configured for entry and exit of containers into and from said container holder, wherein a connecting line that connects opposite sides of said opening that is located at said front end forms an acute angle relative to said transport direction, whereby a container entering said container holder does so along a path that forms an angle relative to said transport direction.

4. The apparatus of claim 1, wherein said first structure comprises an edge having first and second lateral contact surfaces, said lateral contact surfaces having dimensions selected to accommodate said container flange.

5. The apparatus of claim 1, further comprising a container treatment installation, wherein said transporter is arranged to transport containers through said container treatment installation.

6. The apparatus of claim 1, wherein said first structure defines first and second edges separated by a gap to accommodate said container neck, and wherein said first edge leads said second edge in said transport direction.

7. The apparatus of claim 6, wherein said first structure follows a concavely-curved path that intersects said transport direction.

8. The apparatus of claim 1, wherein said first second-structure defines a gap between said opposite bearing surface for at least partially receiving said container flange.

9. The apparatus of claim 8, wherein said gap is greater than a thickness of said container flange.

10. The apparatus of claim 9, wherein said gap is 0.2 mm greater than said thickness.

11. The apparatus of claim 1, wherein said first second-structure and said second second-structure are provided at opposite regions of said container holder.

12. The apparatus of claim 11, wherein said first second-structure and said second second-structure are arranged on a connecting line that is perpendicular to said transport direction.

13. The apparatus of claim 12, wherein said connecting line is offset from a rear end of said first structure by an amount that is greater than half an outside diameter of said container neck.

14. The apparatus of claim 12, wherein first structure has a width at a closed end thereof, and wherein said connecting line is offset from a rear end of said first structure by an amount that is greater than half said width.

* * * * *